United States Patent [19]

Taylor et al.

[11] Patent Number: 5,280,827
[45] Date of Patent: Jan. 25, 1994

[54] VENTURI EFFECT CHARGING SYSTEM FOR AUTOMOBILE BATTERIES

[75] Inventors: Cletus L. Taylor; Walter H. Mueller, both of Long Beach, Calif.

[73] Assignee: Cletus L. Taylor, Long Beach, Calif.

[21] Appl. No.: 995,020

[22] Filed: Dec. 22, 1992

[51] Int. Cl.⁵ ................. B60K 25/00; B60L 8/00
[52] U.S. Cl. .................... 180/165; 180/2.2; 180/65.3; 290/55
[58] Field of Search ........... 180/65.2, 65.3, 2.2, 180/165; 280/212; 290/54, 55; 320/61

[56] References Cited

U.S. PATENT DOCUMENTS

| | | | |
|---|---|---|---|
| 1,903,307 | 4/1933 | Gillio | 180/2.2 |
| 3,328,074 | 6/1967 | Van Rossen | 296/180.1 |
| 3,374,849 | 3/1968 | Redman | 180/65.3 |
| 3,444,946 | 5/1969 | Waterbury | 290/54 X |
| 3,556,239 | 1/1971 | Spahn | 290/55 X |
| 3,791,468 | 2/1974 | Bryan, Jr. | 296/180.1 X |
| 3,878,913 | 4/1975 | Lionts et al. | 180/65.3 |
| 4,002,218 | 1/1977 | Horvat | 180/65.3 |
| 4,012,163 | 3/1977 | Baumgartner et al. | 180/2.2 X |
| 4,075,545 | 2/1978 | Haberer | 320/61 |
| 4,141,425 | 2/1979 | Treat | 180/65.3 |
| 4,168,759 | 9/1979 | Hull et al. | 180/65.3 |
| 4,254,843 | 3/1981 | Han et al. | 180/165 |
| 4,423,368 | 12/1983 | Bussiere | 322/35 |
| 4,632,205 | 12/1986 | Lewis | 180/165 |

FOREIGN PATENT DOCUMENTS

| | | | |
|---|---|---|---|
| 2820628 | 11/1979 | Fed. Rep. of Germany | 180/2.2 |
| 2498532 | 7/1982 | France | 180/2.2 |
| 2665413 | 2/1992 | France | 180/2.2 |
| 0037078 | 3/1982 | Japan | 180/2.2 |
| 0056943 | 4/1983 | Japan | 180/2.2 |
| 0022578 | 10/1907 | United Kingdom | 180/2.2 |

OTHER PUBLICATIONS

Cadillac Solitaire Poster, "The only way to travel is Cadillac Style TM", D. C. Auto Show, Dec. 1990.

Primary Examiner—Brian L. Johnson
Attorney, Agent, or Firm—Christie, Parker & Hale

[57] ABSTRACT

An electric motor-driven vehicle has a large wind turbine mounted at the rear of the vehicle that rotates about an axis perpendicular to the axis of the vehicle body. A long venturi tube extends along the upper portion of the vehicle above the passenger cab and directs air flow from the front of the vehicle and impinges it upon an upper portion of the turbine blades. A pair of elongated lower screw-type turbines are contained in separate lower venturi effect tubes extending along the lower side of the vehicle below the passenger cab. Air from the lower venturi effect tubes is impinged upon the large turbine in a direction and at a location to increase the force generated from the upper venturi tube. The turbines drive one or more electric power generators coupled to storage batteries for recharging the batteries.

16 Claims, 5 Drawing Sheets

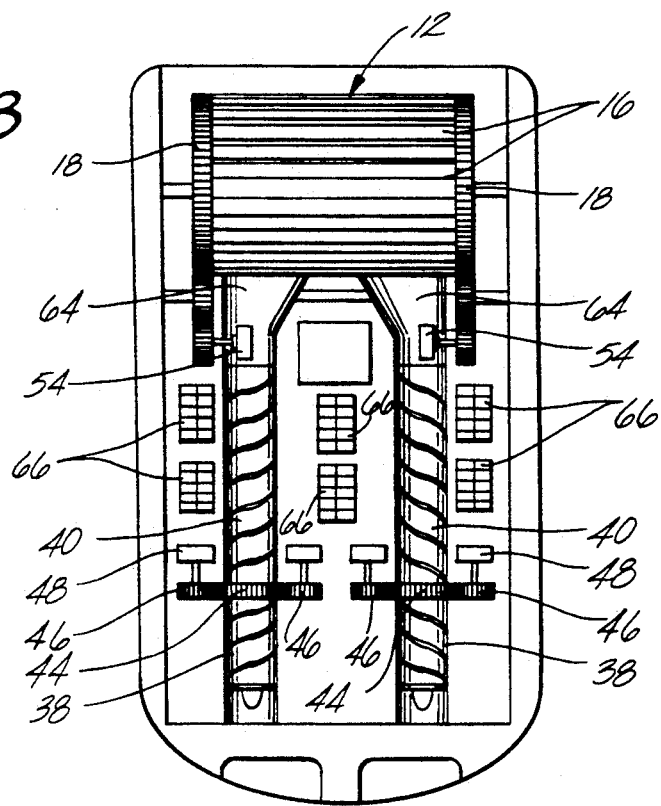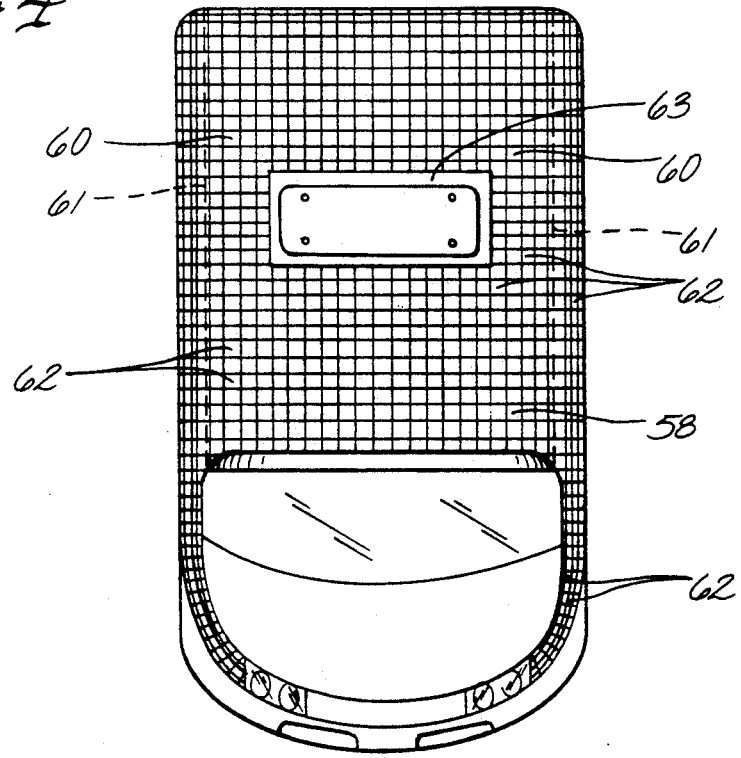

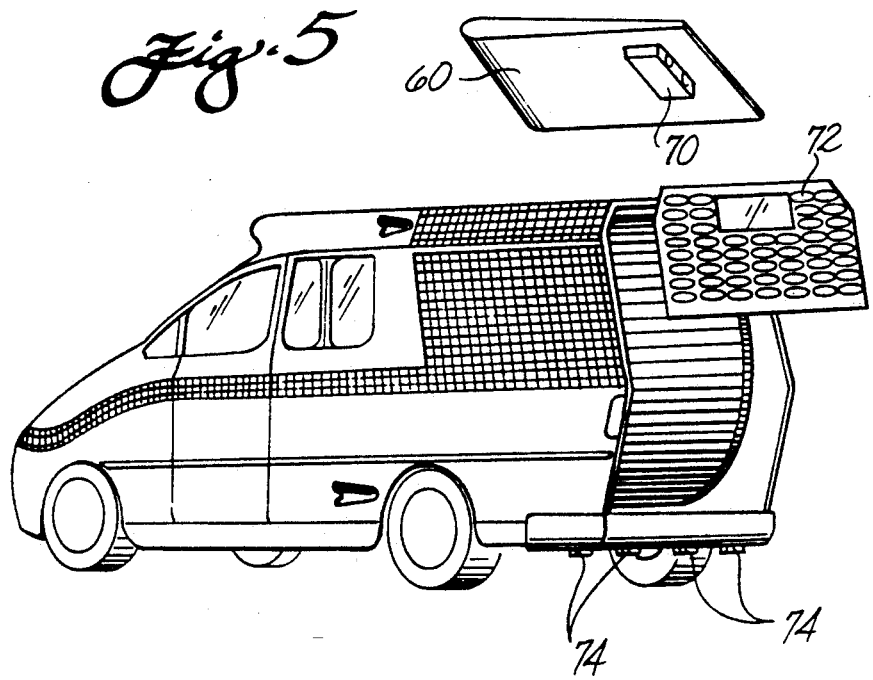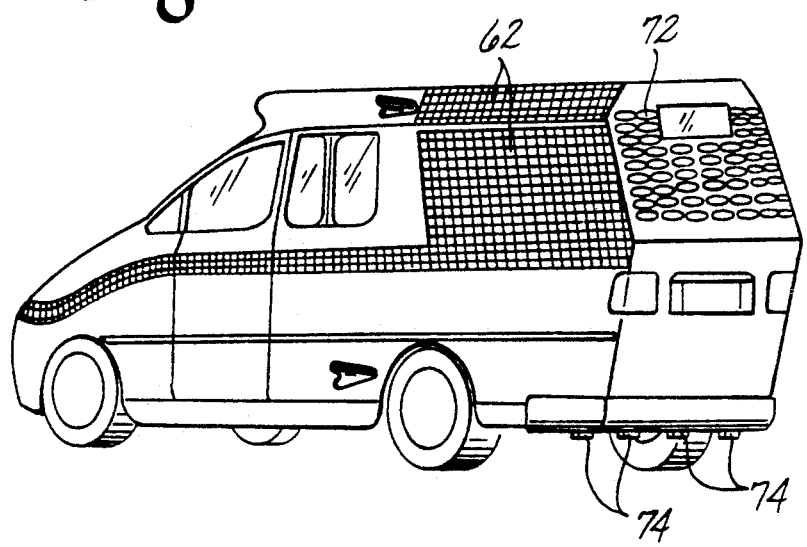

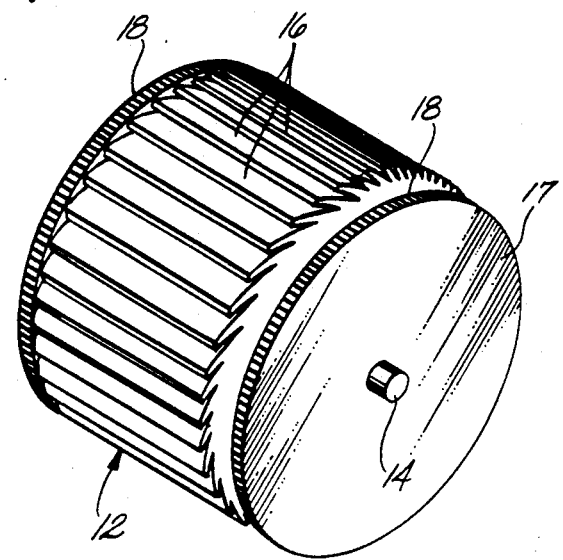
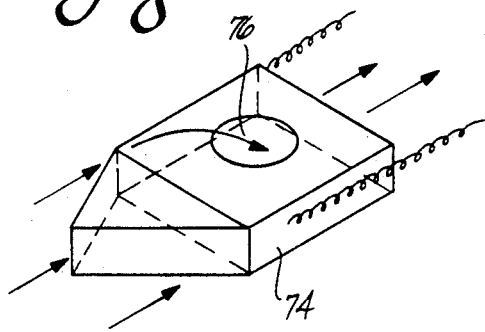
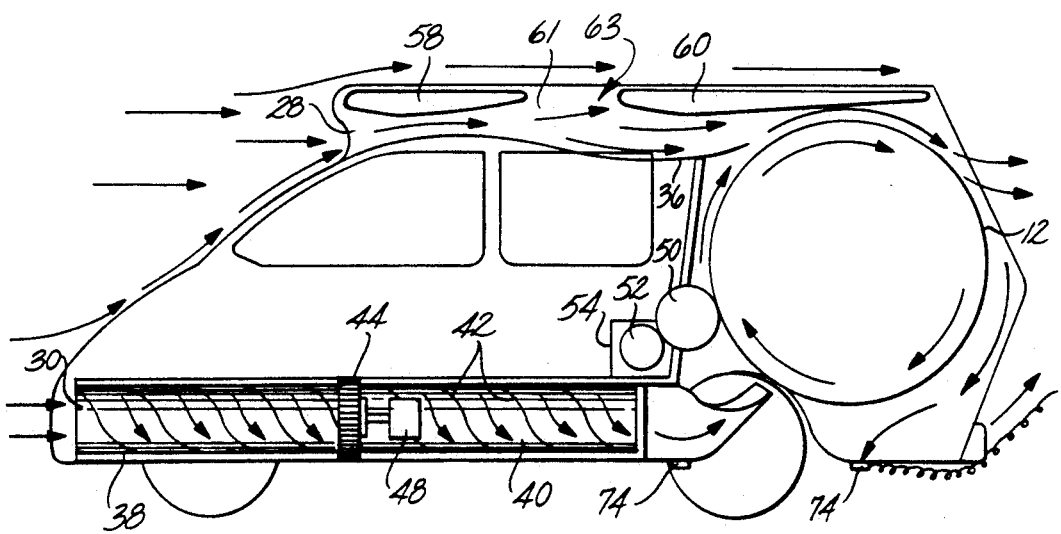

1

VENTURI EFFECT CHARGING SYSTEM FOR AUTOMOBILE BATTERIES

FIELD OF THE INVENTION

This invention relates to vehicles driven by electric power, and more particularly, to vehicles in which electric motors are powered by batteries and the batteries are charged by energy developed from air pressures acting on the vehicle body during use.

BACKGROUND OF THE INVENTION

U.S. Pat. No. 3,444,946 to Waterbury discloses an electric motor-driven automobile in which the batteries which drive the electric motor are charged by a combination of solar cells obtaining energy from sunlight and an alternator or generator driven by a turbine. A venturi tube, through which air is drawn during vehicle travel, impinges air under pressure upon the turbine to rotate the turbine, which causes the alternator or generator to spin and thereby produce electrical energy supplied to the batteries. As Waterbury stated in the '946 patent, "[i]n recent years there has been considerable experimentation with an electric car. Electric cars, per se, have been known for years. These include small battery-operated vehicles such as golf carts, which need to be plugged in to a power source over night, in order to charge the battery so that they can be employed. Attempts to apply this principle to larger cars requiring greater power sources have not been successful since it has not been found possible to apply a great enough power source in order to charge the battery necessary to supply the electric power for the running of the automobile without greatly inconveniencing the driver from a time standpoint. Thus, while the concept of employing electric power is known in the operation of automobiles, such electric power has not been successfully utilized in the operation of standard size automobiles because of the lack of a method, or means, to charge the batteries necessary to supply the electric power for the running of automobiles."

More than 25 years later, these words still ring true, even though Waterbury's patent has merit, and even though, in the intervening time period, there have been improvements in electric power generation for electric motor-driven vehicles using on-board recharging systems for the storage batteries. The present invention provides an improved battery-charging system using an on-board turbine, together with means for enhancing the power generated by the turbine to greatly increase the battery-charging capability of the vehicle. Improvements in battery technology and in materials used in the mechanical system components for driving the turbine and in the turbine itself can only further improve battery-charging capabilities based on the principles of the present invention.

SUMMARY OF THE INVENTION

Briefly, in one embodiment of the invention, an electric motor-driven vehicle has a large wind turbine mounted at the rear of the vehicle. The turbine rotates about an longitudinal axis generally perpendicular to the axis of the vehicle body. A long venturi tube extends along the upper portion of the vehicle above the passenger cab and directs airflow from the front of the vehicle toward the rear of the vehicle while increasing the air pressure, and impinges the air upon an upper portion of the turbine blades. A pair of elongated lower venturi effect tubes extend along the lower sides of the vehicle body below the passenger cab. Air from the lower venturi tubes is increased in pressure and impinged upon the large turbine in a direction and at a location that increases the force generated from the air impinging on the turbine from the upper venturi tube. In one embodiment, separate screw-type turbines are contained in the lower venturi tubes to further benefit from the force of the air impinging on the turbine. The turbines drive one or more electrical power generation means coupled to storage batteries for recharging the batteries.

Further embodiments of the invention include ground-effect systems for stabilizing the vehicle, together with on-board solar cells for enhancing power generation, and further systems for supplementing power to recharge the batteries when the vehicle is at a stand-still.

These and other aspects of the invention will be more fully understood by referring the following detailed description and the accompanying drawings.

BRIEF DESCRIPTION OF THE DRAWINGS

FIG. 3 is a schematic top view showing the apparatus of FIG. 2, together with an on-board storage battery system.

FIG. 4 is a top view schematically showing the exterior of the vehicle with its solar cells.

FIG. 5 is a schematic perspective rear view exploded to show components at the rear of the vehicle.

FIG. 6 is a schematic perspective rear view of the exterior of the vehicle.

FIG. 7 is a semi-schematic perspective view showing the large turbine used in the battery charging system.

FIG. 8 is a schematic side view showing the airflow pattern that drives the turbines.

FIG. 9 is a perspective view showing a vortex/vacuum member for draining the bottom of the turbine and for producing certain stabilizing ground effects for the moving vehicle.

DETAILED DESCRIPTION

Figure 1:
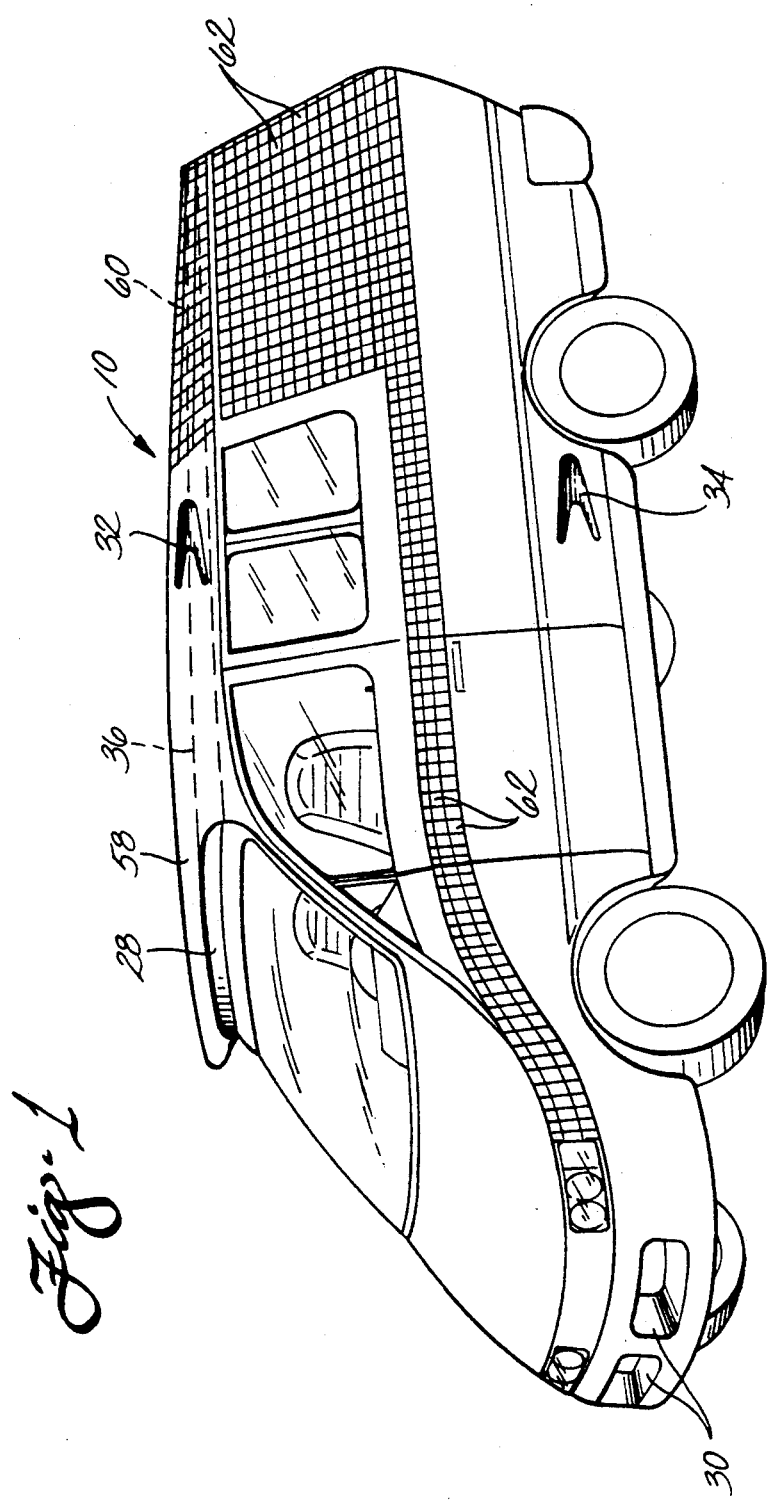
FIG. 1 is a semi-schematic perspective view showing the exterior of an electric power-driven vehicle according to principles of this invention.
Figure 2:
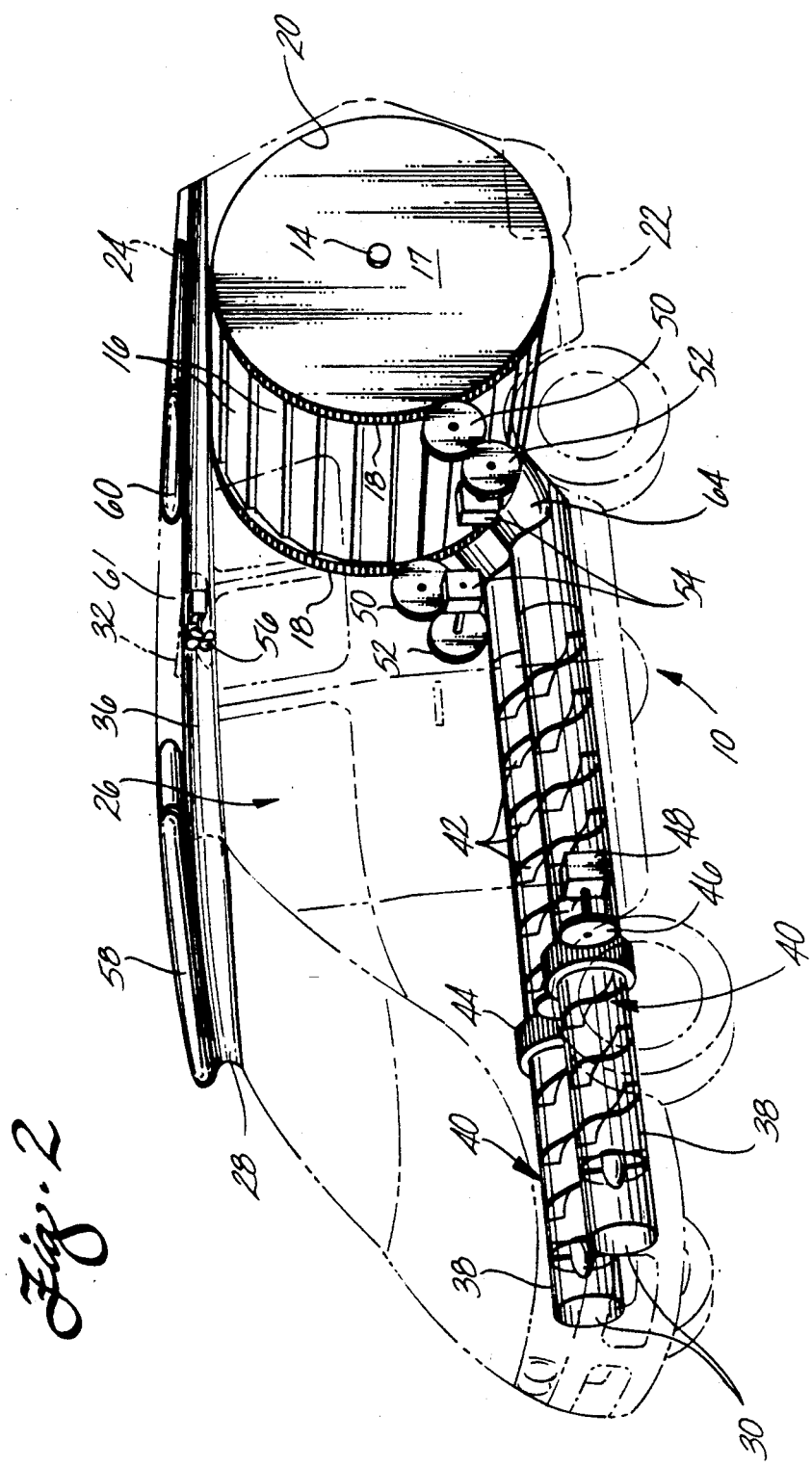
FIG. 2 is a semi-schematic cutaway view, in perspective, showing a large rear turbine and two long screw-type turbines for producing electrical power generation to recharge on-board storage batteries according to principles of this invention.

Referring to FIGS. 1 and 2, an electric motor-driven vehicle 10 according to principles of this invention includes an electric motor (not shown) for driving the wheels of the vehicle. A large on-board wind turbine 12 is mounted to the rear of the vehicle. The turbine rotates about an axis 14 extending perpendicular to the longitudinal axis of the vehicle. The turbine includes long laterally extending and circumferentially spaced-apart impeller blades 16 extending most of the width of the vehicle, and a pair of opposed gear rings 17 carried on the turbine at its opposite ends. Gear teeth 18 on the outer perimeter of the rings 17 extend generally in directions parallel to the width of the vehicle and are circumferentially spaced-apart around the circumference of each ring.

FIG. 7 shows an exploded view of the turbine and gear ring assembly. The gear rings are rigidly affixed to and rotate with the turbine, and the gear teeth 18 are spaced on a diameter similar to the diameter of the impeller blades of the turbine.

The turbine is mounted in a large compartment 20 at the rear of the vehicle. The compartment extends in height for most of the vertical dimension of the vehicle from a bottom 22 of the vehicle to a top 24 of the vehicle. Thus, it extends for a height similar to the height of the passenger cab 26 and blocks the line of sight to the rear of the vehicle through its interior. The turbine compartment occupies most of the volume of the vehicle extending to the rear of the vehicle's rear wheels and this volume is commensurate both with the width of the vehicle and its height. The height and width of the turbine are as great as possible, so as to maximize the torque generated by the turbine when it spins about its axis during use.

A long, narrow upper air intake opening 28 extends across the front upper portion of the vehicle above the passenger cab. Dual lower air intake openings 30 are located at the front lower corners of the vehicle body below the passenger cab level. Dual upper side air intake openings 32 are located at about the upper midpoint of the vehicle on its opposite sides, and dual lower side air intake openings 34 are located on the lower sides of the vehicle, generally below the upper side air intakes 32.

The upper front air intake opening 28 leads into an elongated upper venturi effect tube 36 contained internally within the upper interior portion of the vehicle body and extending the length of the vehicle body above the passenger cab. The upper venturi tube can be configured in height and width with a desired cross-sectional geometric configuration that produces maximum force of the air flowing through the venturi tube from the air intake opening 28 to its point of impingement upon the turbine. In the illustrated embodiment, the air impinges upon the upper portions of the turbine blades generally tangentially with respect to the turbine and at a maximum distance from the axis of rotation of the turbine so as to maximize the torque produced on the turbine when it rotates in response to impinging air from the upper venturi tube.

The lower front air intake openings 30 lead into a pair of elongated lower venturi effect tubes 38 extending longitudinally along opposite lower sides of the vehicle below the level of the passenger cab. Air passing into the lower venturi tubes is directed toward the turbine in a direction and at a location on the turbine blades that rotates the turbine in the same direction of rotation in which the turbine is rotated by air impinging on it from the upper venturi tube. In this way, the impinging air directed at the turbine from the lower venturi tubes enhances the force applied to the turbine from air flowing in the upper venturi tube.

Although the lower venturi tubes 38 can be essentially open tubes from end to end for directing the flow of air toward the turbine 12 and impinging it upon its rotating impeller blades 16, FIG. 2 illustrates a presently preferred turbine force-enhancing system in which a pair of elongated screw-type turbines 40 with helical impeller blades 42 that extend through most of the length of the lower venturi tubes. In the illustrated embodiment, the lower screw-type impeller blades extend from a short distance inboard from the front air-intake openings 30 along most of the length of the vehicle to the vicinity of the rear turbine 12. Gear rings 44 extend around the outside of the screw-type turbines and each gear ring 44 rotates a corresponding gear 46 that spins a pair of alternators or generators 48. Similarly, the outer gear rings 18 of the large turbine 12 rotate gear wheels 50 and 52 for providing gear reduction between the large turbine and corresponding alternators or generators 54, which spin in response to the rotation of the large turbine and its coupling to the alternators or generators 54 through the gear reduction.

FIGS. 1 and 2 illustrate other auxiliary features of the invention which include small turbo fans 56 in the upper air intake openings for directing airflow into the large turbine 12 when the vehicle is at a stand-still. Front and rear ground effect wings 58 and 60 extend laterally across front and rear upper portions of the vehicle, to provide means for stabilizing the vehicle on the road, particularly at high speeds. The ground effect wings 58 and 60 also are important elements of the venturi tube effect of the upper venturi tube 36. The front and rear ground effect wings are spaced apart lengthwise along the top of the vehicle. They are rigidly affixed at their ends to rigid left and right side rails 61 extending along the upper sides of the vehicle. This leaves an upper opening 63 in the top of the vehicle between the front and rear ground effect wings. A rear lower ground effect wing 59 extends across the rear of the vehicle, and can also function as a rear bumper. This lower ground effect wing can add stability when the vehicle travels at high speeds. An array of individual solar cells 62 are mounted on the exterior of the vehicle to provide a further source of electrical power that can be generated during use and converted to electrical energy for charging the battery system.

FIG. 3 is a top cutaway view showing the screw-type turbines 40 arranged in a counter-rotating system of airflow in the lower venturi tubes 38. At the rear of the venturi tubes, the tubes fan out at an angled end region 64 for directing the flow of air from the screw-type impellers toward the circumference of the fan blades 16. FIG. 3 also shows the gearing arrangement of the gear rings 44 and 46 and the alternators/generators 48 for recharging the batteries shown schematically at 66. Preferably, the batteries are made up of a number of individual 12-volt Ni-Cad batteries in separate units spaced apart within the lower interior portion of the vehicle body. The battery packs can be used in a rotating manner to balance charge power during use.

FIG. 4 shows the array of solar cells 62 at the top of the vehicle. These solar cells are located on the front and rear upper ground effect wings 58 and 60 of the vehicle. The solar panels and air ground effect wings are combined as a unit.

FIGS. 5 and 6 show rear views of the vehicle. As shown in the exploded view of FIG. 5, the rear ground effect wing 60, in addition to carrying the external array of solar cells, also carries a rearview video camera 70. Since the driver's line of sight is blocked by the large wind turbine, the video camera is used to generate a rearview mirror "simulating" visual image of the road to the rear of the vehicle for superimposing on a rearview screen at the driver's side of the vehicle.

FIG. 6 also shows a rear panel 72 that covers the upper rear portion of the vehicle behind the large wind turbine. The rear panel 72 is an exhaust panel that can be made of hexcell or other geometric designs with openings to produce a laminar airflow pattern exiting the exhaust area of the vehicle behind the wind turbine. The panel also protects the turbine from external objects entering the turbine. An optional solid panel (not shown) can raise or lower behind the turbine to either protect the turbine when the car is parked or to open and allow for airdraft passage through the vehicle when the turbine is operating.

FIGS. 5 and 6 also show vortex/vacuum members 74 spaced apart across the bottom of the vehicle below the compartment 20 for the large wind turbine and the end portions of the lower venturi tubes that contain the screw-type turbines. The vortex/vacuum members function to drain the bottom of the turbines and create a vortex to produce laminar airflow along the outer tailgate portion of the vehicle. Vacuum pressure is also created along the interior wall leading to the turbine. This beneficial vacuum pressure, in effect, causes additional force on the large wind turbine to enhance its spinning action, in addition to forces produced by the upper venturi and the lower venturi tubes.

FIG. 8 is a cross-sectional view showing the various airflow and turbine rotational effects caused by forward motion of the vehicle. These effects rotate the turbines and create power generation for use in recharging the batteries. The large exhaust panel with its location to the rear of the vehicle creates a vacuum pressure area to be filled with exhaust from the turbines. The vortex/vacuum members drain the turbines while producing laminar airflow along the tailgate through the vortex that results. With the use of the ground effect wings for stability as a part of the venturi tubes, a group of improvements are made over previous systems for driving alternators/generators to recharge batteries.

FIG. 9 is an enlarged view showing the vortex vacuum member 74 having a drainhole 76 in the bottom of the turbine compartments. The boxlike extension over the drainhole protects from stray debris.

Thus, the present invention provides for the use of a large venturi turbine in the rear of an electric vehicle with two or more venturi effect tubes directing airflow to enhance force impinging on the turbine. This, coupled with the beneficial vacuum pressures available because of the location at the back of the vehicle, and the large size of the turbine, produces an improvement over prior art electric vehicles. The ground effect wings along the top of the vehicle help to stabilize the vehicle at high speeds, while providing for a placement of solar panels. The screw-type turbines make use of the air pressures impinging on the large wind turbine, by providing additional sources of energy for driving a number of separate alternators/generators attached to each turbine, depending on the necessary level of power generation. Each turbine has its own vortex/vacuum member at the bottom of the turbine to not only drain moisture, but to also create beneficial vacuum-pressure effects within the turbine housing and beneficial vortex effects along the outside of the turbine housing, to generate laminar airflow along the back of the vehicle.

The present invention having been described in the context of the presently preferred embodiment and best mode for carrying out the invention, it is understood that the specific description is not intended to be restrictive and that various arrangements of parts and modifications may be used without departing from the scope of the invention as claimed below.

What is claimed is:

1. In an electric motor-driven vehicle having a vehicle body with a front and a rear, and a passenger compartment between the front and the rear of the vehicle body, the vehicle body having a height and a width, and batteries for supplying electrical power to the motor, an improved battery charging system comprising a rotary turbine with turbine blades mounted at the rear of the vehicle body with an axis of rotation generally perpendicular to a longitudinal axis of the vehicle body, the turbine being mounted for rotation behind the passenger compartment, in which the diameter of the rotating turbine extends over most of the height and width of the vehicle body, with means for electric power generation on the vehicle body coupled to the turbine for charging the batteries in response to rotation of the turbine, at least one upper venturi effect tube with an upper air inlet opening facing toward the front of the vehicle body and connected with an extending along an upper portion of the vehicle body for directing an intake of air generated from forward motion of the vehicle body from an upper front portion of the vehicle toward an upper region of the turbine for increasing air pressure within the upper venturi tube and impinging the air under pressure on the turbine blades to rotate the turbine, and at least one lower venturi effect tube with a lower air inlet opening separate from the upper air inlet opening and facing toward the front of the vehicle body and connected with and extending along a lower portion of the vehicle body for directing a separate intake of air generated from forward motion of the vehicle body from a lower front portion of the vehicle toward the turbine for increasing air pressure within the lower venturi tube and impinging the air in a direction and at a sufficient force upon the turbine at a separate location thereon to increase the pressure applied to rotate the turbine over the force of impinging air flow from the upper venturi tube.

2. An apparatus according to claim 1 in which a pair of the lower venturi effect tubes extend along opposite sides of the vehicle body below the passenger compartment and in which the upper venturi effect tube extends above the passenger compartment.

3. An apparatus according to claim 1 including a separate elongated screw-type turbine in at least one lower venturi tube, and in which each screw type turbine rotates about an axis generally parallel to the longitudinal axis of the vehicle body, each screw-type turbine being separately coupled to the means for electrical power generation for enhancing an electrical power output of the means for electrical power generation for recharging the batteries.

4. Apparatus according to claim 1 in which at least one separate lower venturi effect tube has an angled end region that directs airflow up to impinge on the turbine at a location spaced below but impinging on the turbine in the same general direction as the separate flow impinging on the turbine from the upper venturi tube.

5. Apparatus according to claim 2 including lower corners on the front of the vehicle, in which the vehicle body has air intakes at a top front portion of the vehicle leading to the upper venturi tube and at least two further air intakes at the two lower front corners of the vehicle body for directing air through corresponding lower venturi effect tubes.

6. Apparatus according to claim 3 in which the screw-type turbines each rotate to drive separate gear systems coupled to the means for electrical power generation.

7. Apparatus according to claim 2 in which the pair of lower venturi effect tubes are elongated void spaces directing the flow of air toward the turbine.

8. Apparatus according to claim 1 including a means for ground effect on an upper outer portion of the vehicle body to stabilize vehicle travel at high speeds, said ground effect means projecting from opposite sides of the vehicle body and forming a portion of the upper venturi tube.

9. Apparatus according to claim 8 including a combined rear bumper and a lower airfoil to stabilize the vehicle.

10. Apparatus according to claim 1 including at least one vortex/vacuum members below the turbine to stabilize airflow along a lower portion of the moving vehicle and to provide drainage below the turbine.

11. Apparatus according to claim 4 in which a pair of lower venturi effect tubes extend along opposite sides of the vehicle body below the passenger compartment and in which the upper venturi effect tube extends above the passenger compartment.

12. Apparatus according to claim 1 in which the vehicle body includes a rear exhaust panel open to the exterior of the vehicle and located to the rear of the turbine for exhausting air away from the rear of the vehicle.

13. Apparatus according to claim 12 in which the rear exhaust panel has a width substantially similar to the width of the vehicle body.

14. Apparatus according to claim 12 in which the rear exhaust panel has a surface area open to the atmosphere which is greater than the combined area of the upper and lower front air inlet openings.

15. In an electric motor-driven vehicle having a vehicle body with a front and a rear, the vehicle body having height and width, and batteries for supplying electrical power to the motor, an improved battery charging system comprising a rotary turbine with turbine blades mounted at the rear of the vehicle body with an axis of rotation generally perpendicular to a longitudinal axis of the vehicle body, in which the diameter of the rotating turbine extends over most of the height and width of the vehicle body, with means for electric power-generation on the vehicle body coupled to the turbine for charging the batteries in response to rotation of the turbine, at least one upper venturi effect tube connected with and extending along an upper portion of the vehicle body for directing an intake of air from an upper portion of the vehicle toward an upper region of the turbine for impinging air under pressure toward the turbine blades to rotate the turbine, and at least one lower venturi effect tube connected with and extending along a lower portion of the vehicle body for directing a separate intake of air from a lower portion of the vehicle toward the turbine in a direction and at a sufficient force separately impinging upon the turbine to increase the pressure applied to rotate the turbine over the force of impinging air flow from the upper venturi tube, and further comprising a separate elongated screw-type turbine in at least one lower venturi tube, and in which each screw type turbine rotates about an axis generally parallel to the longitudinal axis of the vehicle body, each screw-type turbine being separately coupled to the means for electrical power generation, for enhancing an electrical power output of the means for electrical power generation, for recharging the batteries.

16. Apparatus according to claim 15 in which the screw-type turbines each rotate to drive separate gear systems coupled to the means for electrical power generation.

* * * * *